United States Patent [19]

Lewis et al.

[11] Patent Number: 5,410,007
[45] Date of Patent: Apr. 25, 1995

[54] PARTICULATED PLATINUM GROUP METAL CONTAINING SILICONE RESIN CATALYST, METHOD FOR MAKING, AND USE

[75] Inventors: Larry N. Lewis; Jeffrey H. Wengrovius, both of Scotia; Timothy B. Burnell, Schenectady; Jonathan D. Rich, Rexford, all of N.Y.

[73] Assignee: General Electric Company, Schenectady, N.Y.

[21] Appl. No.: 251,428

[22] Filed: May 31, 1994

[51] Int. Cl.$^6$ ............................................. C08G 77/08
[52] U.S. Cl. ..................................... 528/15; 502/158
[58] Field of Search ........................... 502/158; 528/15

[56] References Cited

U.S. PATENT DOCUMENTS

| | | |
|---|---|---|
| 2,632,013 | 3/1953 | Wagner . |
| 2,970,150 | 1/1961 | Bailey . |
| 3,220,972 | 11/1965 | Lamoreaux . |
| 3,344,111 | 9/1967 | Chalk . |
| 4,481,341 | 11/1984 | Schlak et al. . |
| 4,588,800 | 5/1986 | Palensky et al. . |
| 4,600,484 | 7/1986 | Drahnak . |
| 5,064,924 | 11/1991 | Shimizu et al. . |
| 5,204,384 | 4/1993 | Matsushita et al. . |

FOREIGN PATENT DOCUMENTS 0349898 6/1989 Germany .
0339803 3/1989 United Kingdom .

OTHER PUBLICATIONS

Article—Homogeneous Catalytic Hydrosilylation of the C=C Double Bond in the Presence of Transition Metal Catalysts, Rita Skoda-Foldes, et al., Journal of Organometallic Chemistry, 408, (1991), 297–304.
Article—(n5—Cyclopentadienyl)trialkylplatinum Photohydrosilylation Catalysts. Mechanism of Active Catalyst Formation and Preparation of a Novel (Bis(-silyl)platinum Hydride, L. D. Boardman, American Chemical Society—Organometallics, (1992), 11, 4194–4201.
Article—Synthesis and Structure of a rac-Tris(divinyl-disiloxane)diplatinum(0) Complex and its Reaction with Maleic Anhydride, P. B. Hitchcock et al., Angew. Chem. Inst. Ed. Engl., 30, (1991), No. 4, 438–440.

*Primary Examiner*—Melvyn I. Marquis
*Attorney, Agent, or Firm*—William H. Pittman

[57] ABSTRACT

The present invention is directed to solvent free particulated platinum group metal silicone resin catalyst resulting from the spray drying of an organic solvent mixture of a platinum group metal complex, and an alkenyl containing organosiloxane resin. Heat curable organopolysiloxane compositions containing such particulated platinum group metal silicone resin catalyst are also provided.

8 Claims, No Drawings

PARTICULATED PLATINUM GROUP METAL CONTAINING SILICONE RESIN CATALYST, METHOD FOR MAKING, AND USE

BACKGROUND OF THE INVENTION

The present invention relates to a particulated, solvent free, platinum group metal silicone resin containing catalyst. More particularly, the present invention relates to the spray drying of a mixture of an organic solvent solution of an alkenyl substituted organosiloxane resin, and a solution of a platinum group metal complex.

Heat curable platinum group metal catalyzed organopolysiloxane compositions are often classified as one package or two package mixtures. A one package organopolysiloxane mixture is generally stable at ambient conditions for a period of at least several months. It is generally activated thermally or with radiant energy. A two package mixture generally cures at ambient temperatures, or at an elevated temperature within a relatively short period of time upon adding a curing catalyst to a silicone network mixture. Upon addition, of the catalyst, the resulting curable mixture should have a satisfactory "pot life" or "work life".

Although platinum group metal catalysts used in one part and two part silicone mixtures can provide valuable thin section or deep section cured silicone products, a platinum group metal catalyst, such as a platinum catalyst, is often used in the form of an organic solvent solution as shown by Lewis, U.S. Pat. No. 4,681,963. The most active platinum catalyst has been found to be zero valent platinum olefin complexes in a liquid media. However, some of these zero valent platinum catalysts suffer from poor shelf stability at ambient temperatures.

Schlak et al, U.S. Pat. No. 4,481,341, shows that a platinum catalyst also can be used as a dispersion in a solid silicone resin. Shimizu et al, U.S. Pat. No. 5,064,924, describes one part organopolysiloxane compositions which use a platinum catalyst encapsulated within finely divided particles of cured silicone rubber. In addition, the "solid encapsulated platinum catalysts", often have poor solubility in silicones.

A principal advantage of the encapsulated platinum group metal catalysts of the prior art is that these catalysts are often solvent free. However, when incorporated into a silicone to form a one or two package silicone mixture, encapsulated platinum group metal catalysts often must be activated by excessive heat to provide a satisfactory rate of cure, because the platinum group metal catalyst may be shielded by a wall of silicone.

It would be desirable therefore, to provide a solvent free, platinum group metal silicone resin containing catalyst which is both catalytically active, and has an indefinite shelf stability at ambient temperatures. It also would be advantageous to provide curable organopolysiloxane compositions having a satisfactory pot life at ambient temperatures which are catalyzed by the use of a solvent free platinum group metal catalyst.

SUMMARY OF THE INVENTION

The present invention is based on the discovery that a solvent free particulated platinum group metal catalyst can be made which is shelf stable for an indefinite period of time under ambient conditions and has a surprising degree of reactivity when in contact with a curable silicone mixture under ambient conditions. The improved platinum group metal catalyst can be made by spray drying a mixture of a solution of a platinum group metal complex, such as a solution of a zero valent platinum and a vinyl siloxane, and an organic solvent solution of an alkenyl substituted organosiloxane resin.

STATEMENT OF THE INVENTION

There is provided by the present invention, a particulated platinum group metal silicone resin catalyst having an indefinite shelf stability at ambient temperatures, comprising, a spray-dried reaction product of (A) an organic solvent solution of an alkenyl substituted organosiloxane resin comprising chemically combined $SiO_2$ units, and organo siloxy units, and an average ratio of about 0.01 to about 2.5 alkenyl radicals per silicon atom, and (B) an organic solvent solution of a platinum group metal complex, which particulated platinum group metal silicone resin catalyst has an average of from about 0.05% to about 5% by weight of chemically combined platinum group metal.

In a further aspect of the present invention, there is provided a method for making a particulated platinum group metal silicone resin catalyst, having from about 0.05% to about 5% by weight of chemically combined platinum group metal, which comprises spray drying at a temperature of about 80° C. to about 300° C., a mixture comprising by weight, (C) 100 parts of an organic solvent solution of an alkenyl substituted organosiloxane resin comprising chemically combined organosiloxy units and $SiO_2$ units, and, (D) 0.1 to 50 parts of an organic solvent solution of a platinum group metal complex.

In an additional aspect of the present invention, there is provided a substantially solvent free heat curable organopolysiloxane composition comprising by weight, (E) 100 parts of a vinylsiloxane fluid having a viscosity of about 100 to about 500,000 centipoise at 25° C., (F) 1 to 40 parts of a silicon hydride siloxane, and, (G) an amount of a particulated platinum group metal containing silicone resin material having an indefinite shelf stability at ambient temperatures, which is effective as a platinum group metal catalyst comprising, the spray-dried reaction product of (H), an organic solvent solution of an alkenyl substituted organosiloxane resin comprising chemically combined $SiO_2$ units, and organo siloxy units, and an average ratio of about 0.01 to about 2.5 alkenyl radicals per silicon atom, and (I) an organic solvent solution of a platinum group metal complex, which particulated platinum group metal silicone resin catalyst has an average of from about 0.05% to about 5% by weight of chemically combined platinum group metal.

The alkenyl substituted organosiloxane resin used in making the particulated platinum group metal silicone resin catalyst and shown above as (A), is preferably comprised of chemically combined M and Q units, or M, Q, and D units, where the M units and the D units can be the same or different, Q is $SiO_2$, M is $(R)_a(R^1)_bSiO_{0.5}$, and D is $(R)_c(R^1)_dSiO$, R is a member selected from the group consisting of the same or different $C_{(2-8)}$ alkenyl radicals and $C_{(4-8)}$ cycloalkenyl radicals, $R^1$ is is a member selected from the same or different $C_{(1-12)}$ monovalent organic radicals, "a" is a whole number equal to 0 to 3 inclusive, "b" is a whole number equal to 0 to 3 inclusive, and the sum of a+b is equal to 3, "c" is a whole number equal to 0 to 2 inclusive, d is a whole number equal to 0 to 2 inclusive and the sum of c+d is equal to 2. In particular instances, from 0 to up to about 25 mol % of $R^2SiO_{1.5}$ units also can be present, in the alkenyl substituted organosiloxane resin based on the total moles of siloxy units, where $R^2$ is selected from R or $R^1$.

Radicals included within R are for example, alkenyl radicals, such as vinyl, propenyl, butenyl, and pentenyl; radicals included within $R^1$ are for example, $C_{(1-8)}$ aliphatic radicals, such as alkyl radicals, for example methyl, ethyl, propyl and butyl; haloalkyl, such as trifluoropropyl; aromatic radicals, such as phenyl, tolyl, xylyl and napthyl radicals. In instances where alkenyl radicals are attached to silicon in the above described organosiloxane resin, it is preferred to have such alkenyl radicals present as chemically combined $C_2H_3(R^1)_2SiO_{0.5}$ units.

Among the platinum group metals which can be used in the practice of the invention, there are included, platinum group metal complexes of platinum, rhodium, ruthenium, osmium, iridium, and palladium. Platinum complexes are preferred and include platinum compounds such as $H_2PtCl_6 \cdot nH_2O$ and metal salts such as $Na_2PtCl_6 \cdot nH_2O$, $K_2PtCl_6 \cdot nH_2O$, and $K_2PtCl_4 \cdot nH_2O$. Also $PtCl_4$, and platinous type halides, such as $PtCl_2$, $Na_2PtCl_4 \cdot nH_2O$, $H_2PtCl_4$, $K_2PtBr_4$ can be used.

In addition, to the above platinum halides there also can be used platinum halide complexes with aliphatic hydrocarbons. Some of these compounds are taught in Ashby U.S. Pat. Nos. 3,159,601 and 3,159,662, such as $[(CH_2=CH_2) \cdot PtCl_2]_2$, $(PtCl_2 \cdot C_3H_6)_2$. Platinum halides shown by Lamoreaux U.S. Pat. No. 3,220,972, which is a reaction product of chloroplatinic acid hexahydrate and octyl alcohol also can be used. Particularly preferred, are complexes shown by Karstedt U.S. Pat. Nos. 3,715,334 and 3,775,452 which are incorporated herein by reference.

Additional platinum group metal compounds which can be used in the practice of the invention are (COD) platinumdichloride (COD=1,5-cyclooctadiene), bis(-COD) platinum, bis (ethylenediamine) platinum dichloride, bis(diethylsulfide) platinum dichloride, bis(benzonitrile) platinum dichloride, (COD) dimethyl platinum, allyl palladium chloride, dichloro bis(triphenylphosphine) palladium, (COD) palladium dichloride, dichloro diamine palladium, bis(pentamethylcyclopentadienyl) dichloro rhodium, chloro bis(ethylene) rhodium dimer, chloro (COD) rhodium dimer, dichloro (COD) ruthenium, dichloro tricarbonyl ruthenium dimer, dichloro tris(triphenylphosphine) ruthenium, osmium carbonyl, chloro carbonyl bis(triphenylphosphine) iridium, chloro (COD) iridium dimer, etc.

An amount of the particulated platinum group metal containing silicone resin catalyst can be used which is sufficient to provide from about 5 ppm to about 250 ppm of platinum, based on the weight of the solvent free heat curable organopolysiloxane composition.

The preferred MQ resin is in the form of a toluene dispersible alkenyl containing organosiloxane hydrolyzate. At least 90% of all the organo groups of the alkenyl containing organosiloxane hydrolyzate are alkyl groups and preferably methyl. The organosiloxane hydrolyzate can contain from about 0.2% to about 5%, and preferably from about 1% to about 3% by weight of hydroxy radicals based on the total weight of organosiloxane resin.

A method for making the alkenyl containing organosiloxane hydrolyzate having triorganosiloxy units and tetrasiloxy units is shown by Daudt, U.S. Pat. No. 2,676,182, which is incorporated herein by reference. For example, a silica hydrosol can be reacted under acidic conditions with a source of triorganosiloxy units, such as shown by formula (1) for example a hexaorganodisiloxane, preferably, hexamethyldisiloxane, or a hydrolyzable triorganosilane, for example, trimethylchlorosilane, or mixtures thereof, followed by recovering a benzene dispersible resinous copolymer. In forming the alkenyl containing MQ resin, alkenyl groups such as vinyl groups can be introduced into the resin by employing an organohalosilane, such as dimethylvinylchlorosilane. Alternatively, condensation between silanol of the MQ resin and an alkenyl substituted silazane, such as a bis(dimethylvinylsilazane) can be used.

Suitable organic solvents which can be used to make MQ resins can have boiling points below approximately 250° C., which include suitable aromatic hydrocarbons as well as aliphatic hydrocarbons, such as mineral spirits, hexane, heptane and cyclohexane.

For ease of handling, it has been discovered that by spray drying the organic solvent solution of the mixture of the solution of the organosiloxane hydrolyzate and the solution of the platinum group metal complex, the resulting platinum group metal containing material can be recovered as a finely divided particulate having a particle aggregate size in the range of from about 10 nanometers to 200 microns. Spray drying of the organic solvent solution of the organosiloxane hydrolyzate and the solution of platinum group metal complex can be accomplished with a spray dryer having at least one rotating vortex atomizer nozzle in a dry-gas stream or having a two-fluid nozzle. Temperatures which can be employed in the dry-gas stream, such as nitrogen, can be from 80° C. to 300° C. and preferably from 100° C. to 250° C. The output temperature of the gas stream formed on drying is from 50° C. to 200° C.

Vinylsiloxane fluids which can be used in the practice of the invention can have a viscosity of from about 100 to 200,000 centipoises and from about 0.05 to about 3.5 mole %, and preferably from 0.14 to about 2 mole % of vinylsiloxy units based on the total moles of condensed organosiloxy units in the vinylsiloxane. The preferred vinyl siloxane fluids are included within the following formula:

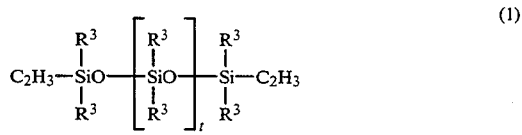

(1)

where $C_2H_3$ is vinyl, and $R^3$ is selected from $C_{(1-13)}$ monovalent organic radicals free of olefinic unsaturation, and t is a positive integer having a value sufficient to provide a vinyl siloxane viscosity of from about 100 to 200,000 centipoises at 25° C. Preferably, $R^3$ is selected from alkyl radicals of 1 to 8 carbon atoms, such as methyl, ethyl, propyl; aryl radicals such as phenyl, methylphenyl, ethylphenyl; cycloalkyl radicals, cycloheptyl and haloalkyl radicals such as 3,3,3-trifluoropropyl. Preferably, the vinyl siloxane has terminal units of the formula, $$C_2H_3(CH_3)_2SiO_{0.5}$$

Vinylsiloxanes within Formula (1) can be prepared by equilibrating the appropriate cyclotetrasiloxane with appropriate vinyl terminated low molecular weight polysiloxane chain-stoppers. However, if vinyl organosiloxy units are desired in the backbone, a predetermined amount of cyclic vinylorganosiloxane can be used in the equilibration mixture. A preferred chain-stopper for such equilibration reaction is a low molecular weight vinyl terminated organopolysiloxane such as the corresponding disiloxane, trisiloxane, tetrasiloxane. These low molecular weight vinyl terminated polysiloxane polymers are produced by hydrolyzing the appropriate chlorosilanes particularly vinyl diorganochlorosilanes along with diorganodichlorosilanes to produce the desired chain-stopper. The chain-stopper can be equilibrated with octamethylcyclotetrasiloxane in the presence of a catalyst to produce the desired vinyl siloxane having a viscosity varying from 100 to 200,000 centipoises at 25° C. The catalyst which is utilized is preferably a mild acid catalyst, such as toluenesulfonic acid or an acid treated clay such as Filtrol, which is a sulfuric acid activated clay manufactured and sold by Engelhard Corp. of Edison, N.J. When the equilibration has proceeded to about 85% completion, the acid catalyst can be neutralized with a base or simply filtered if acid activated clay is used to leave behind the linear polymer. Preferably, excess cyclics are stripped off so that the linear polymer will have a low volatile content and be relatively pure. There can also be utilized an alkali metal hydroxide as the catalyst such as for instance potassium or sodium hydroxide.

In particular instances, there can be used in combination with the vinylsiloxane of formula, a vinyl containing polysiloxane polymer composed of M units such as $(CH_3)_3SiO_{0.5}$ and $C_2H_3(CH_3)_2SiO_{0.5}$ and $SiO_2$ units.

The silicon hydride siloxane fluid can have from 0.04% to 1.4% by weight of chemically combined hydrogen attached to silicon. One form of the silicon hydride siloxane is a "coupler", having the formula:

where $R^4$ is selected from $C_{(1-13)}$ monovalent organic radicals free of olefinic unsaturation and n is an integer having a value sufficient to provide the "coupler" with a viscosity of 1 to 500 centipoises at 25° C. and from about 3 to 9 mole percent of chain-stopping diorganohydride siloxy units, based on the total moles of chemically combined siloxy units in the silicon hydride siloxane fluid.

In addition to the silicone hydride coupler, the silicon hydride siloxane used in the heat curable organopolysiloxane compositions of the present invention also can include silicon hydride resins useful as cross-linkers. These cross-linkers can consist essentially of the following chemically combined units,

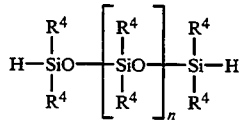

chemically combined with $SiO_2$ units, where the $R^5+$ H to Si ratio varies from 1.0 to 2.7. Silicon hydride resin also can have units of the formula:

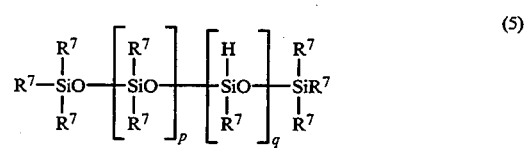

chemically combined with $SiO_2$ units and $(R^6)_2SiO$ units, where the $R^5+R^6+H$ to Si ratio can vary from 1.2 to 2.7, and $R^4$, $R^5$ and $R^6$ are $C_{(1-13)}$ monovalent hydrocarbon radicals free of olefinic unsaturation.

The silicon hydride siloxane can be made by hydrolyzing the corresponding hydride chlorosilanes in the presence of an organic hydrocarbon solvent. For resins having only monofunctional units and tetrafunctional units, a hydrogen diorganochlorosilane can be hydrolyzed with a tetrachlorosilane. Resins having monofunctional siloxy units, difunctional siloxy units, and tetrafunctional siloxy units, can be obtained by hydrolyzing a hydrogen diorgano dichlorosilane, a tetrachlorosilane and a diorganodichlorosilane at particular ratios. Additional silicon hydride resins are shown by Jeram, U.S. Pat. No. 4,040,101 which is hereby incorporated by reference.

Silicon hydride siloxane fluid also can include linear hydrogen containing polysiloxane having the formula:

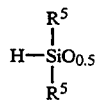

where $R^7$ is a $C_{(1-13)}$ monovalent organic radical free of olefinic unsaturation, and p and q are integers having values sufficient to provide a polymer having a viscosity of from 1 to 1,000 centipoises at 25° C.

The silicon hydride siloxane fluid of formula (5) can be produced by equilibrating the appropriate hydrogencyclopolysiloxane with the appropriate cyclopolysiloxane containing $R^7$ substituent groups, in combination with low molecular weight linear triorganosiloxy endstopped chain-stoppers.

In formulas (1)-(5) and the chemically combined units described therein, $R^3$, $R^4$, $R^5$, $R^6$ and $R^7$ can be the same or different and selected from the group consisting of alkyl radicals having 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The silicon hydride siloxane coupler of formula (2) can be prepared by a hydrolysis process, or an acid catalyzed equilibration process. In the equilibration process, the appropriate cyclotetrasiloxanes are equilibrated with a low molecular weight hydrogen terminated chain-stopper, such as a dihydrogen tetraorganodisiloxane. The acid catalyzed equilibration reaction is much the same as disclosed for the production of the vinyl containing base polymer. By the hydrolysis process, the appropriate hydrogen diorganochlorosilanes are hydrolyzed with the appropriate amount of diorganodichlorosilanes to produce the desired polymer. The resulting silicon hydride siloxane can be separated from undesirable cyclics by stripping.

There can be incorporated in the heat curable organopolysiloxane compositions provided by the method of the present invention from 5 to 100 parts by weight of a filler based on 100 parts by weight of the vinyl siloxane fluid. The filler can be selected from fumed silica, precipitated silica and mixtures thereof. Preferably, less than 50 parts by weight of filler, per 100 parts by weight of the vinyl siloxane fluid is utilized. In place of the reinforcing filler, such as fumed silica, and precipitated silicas, there may be utilized extending fillers which do not unduly increase the viscosity of the composition in the uncured state, by increasing to some extent the tensile strength of the composition. The reinforcing and extending fillers are for instance, titanium dioxide, lithopone, zinc oxide, zirconium silicate, silica aerogel, iron oxide, diatomaceous earth, calcium carbonate, silazane treated silicas, glass fibers, magnesium oxide, chromic oxide, zirconium oxide, aluminum oxide, alpha quartz, calcined clay, carbon, graphite, cork, cotton, synthetic fibers and so forth.

For liquid injection molding applications, it has been found desirable to limit the viscosity below 500,000 centipoises at 25° C. and more preferably, below 200,000 centipoises at 25° C.

Cure of the heat curable compositions of the present invention, can be achieved at temperatures of from 100° C. to 200° C. and preferably 135° C. to 150° C.

In order that those skilled in the art will be better able to practice the present invention, the following example is given by way of illustration and not by way of limitation. All parts are by weight.

EXAMPLE 1

A vinyl containing methylpolysiloxane resin was prepared by initially forming silanol containing MQ resin, where M is $(CH_3)_3SiO_{0.5}$, and Q is $SiO_2$ and thereafter treating the resulting silanol containing MQ resin with 1,3 divinyl tetramethyldisilazane as follows:

Ninety one parts of a sodium silicate solution (225 g, 27% $SiO_2$) were mixed thoroughly with 130 parts of water (321 g). This mixture was added with stirring to 81 parts of 16.5% of HCl in cooled water over a period of 7 min. Shortly after the completion of this addition (within 45 sec.), 87 parts of isopropanol (214.8 g) were added over a period of 5 min. After waiting for a period of 1 min., a mixture of 31.0 parts $Me_3SiCl$ (76.45 g) and 3.4 parts toluene (8.49 g) were next added over a period of 20 min. The reaction mixture was allowed to warm to room temperature and was then heated to reflux for 1.5 hr. 40.5 parts of toluene (100 g) were added with stirring. The reaction mixture was then transferred to an addition funnel in which organic and aqueous layers separated. The aqueous layer was removed, and the organic layer was washed with 300 g water. The water-/isopropanol/toluene azeotrope was distilled from the mixture yielding a 60% by weight solution of a silanol containing methylpolysiloxane resin in toluene having an M/Q ratio of about 0.6.

About 2414 g of the above MQ resin was refluxed under nitrogen to effect removal of residual water/isopropanol. There was then added to the MQ resin, 903 g of 1,3 divinyl tetramethyldisilazane. The mixture was refluxed for 15 hours. Infra-red analysis showed that the the majority of the silanol groups were removed indicating that $C_2H_3(CH_3)_2SiO_{0.5}$ units had been introduced. The toluene solution of the vinyl containing MQ resin was then spray dried using a Niro portable spray dryer equipped with a two fluid nozzle. The rate of drying was 63 Kg/hr and the inlet/outlet temperatures were 244°/118° C. A $^{29}Si$ NMR of the resin in the form of a free flowing white powder, indicated it had a composition of $[(CH_3)_3SiO]_{0.74}(SiO_2) [C_2H_3(CH_3)_2SiO]_{0.07}$. The powder was found to be completely miscible in a silicone fluid Four hundred grams of the above powder were combined with 267 g of toluene. The resulting toluene solution was combined with 80.34 g of a xylene solution of a platinum complex obtained by reacting $H_2PtCl_6$ with 1,3 divinyl tetramethyldisiloxane in accordance with Karstedt U.S. Pat. No. 3,775,452. The combined solutions were spray dried using a Niro portable spray drier. There was used, an inlet temperature of 180° C. and a drying rate of 75 Kg/hr. There was obtained a particulated platinum group metal silicone resin catalyst in the form of a free flowing white powder. Elemental analysis showed the powder contained about 1% by weight of Pt. Analysis of the powder by $^{195}Pt$ NMR showed a resonance at $-6135$ ppm. In addition, TEM analysis (transmission electron microscopy) showed that the sample was free of platinum particles $>10A$ and crystalline platinum regions. This indicated the platinum was in the form of a zero valent platinum olefin complex.

EXAMPLE 2

A heat curable organopolysiloxane composition was prepared by mixing together 72 g of a vinyl terminated polydimethylsiloxane fluid having a viscosity of 80,000 centipoise, 23.8 g of a vinyl polymer consisting of $(CH_3)_3SiO_{0.5}$, $C_2H_3(CH_3)_2SiO_{0.5}$ and $SiO_2$ units, 4.2 g of a silicon hydride crosslinker consisting of $H(CH_3)_2SiO_{0.5}$ units and $SiO_2$ units, and 48 mg of the particulated platinum group metal silicone resin catalyst of example 1. The resulting heat curable organopolysiloxane composition had 10 ppm of Pt.

The same procedure was repeated except that in place of the particulated platinum group metal silicone resin catalyst of example 1, there was used an equivalent ppm of platinum from a platinum complex obtained by reacting $H_2PtCl_6$ with a vinylmethylcyclotetrasiloxane in accordance with Karstedt U.S. Pat. No. 3,775,452 which is referred to hereinafter as the "Karstedt catalyst".

The cure rates of the respective compositions were measured with a Brookfield model DV 11 digital cone viscometer as a function of time at constant temperature (30° C.) using a #52 cone. It was found that the normalized relative rate for the Karstedt catalyst and the spray dried catalyst were substantially similar. However, the stability of the spray dried catalyst was found to be substantially unchanged after 12 months at ambient temperatures, while the Karstedt catalyst became inactive within 14 days at ambient temperatures.

Although the above examples are directed to only a few of the many variables which can be used in the practice of the present invention, it should be understood that the present invention is directed to a much broader variety of particulated platinum group metal silicone resin catalysts, to methods of making and use, as well as to heat curable silicone compositions as set forth in the description preceding these examples.

What is claimed is:

1. A particulated platinum group metal silicone resin catalyst having an indefinite shelf stability at ambient temperatures, comprising, the product obtained by spray drying at a temperature of 80° C. to 300° C., a mixture of (A), an organic solvent solution of an alkenyl substituted organosiloxane resin comprising chemically combined $SiO_2$ units, and organo siloxy units, and an average ratio of about 0.01 to about 2.5 alkenyl radicals per silicon atom, and (B) an organic solvent solution of a platinum group metal complex, which particulated platinum group metal silicone resin catalyst has an average of from about 0.05% to about 5% by weight of chemically combined platinum group metal.

2. A particulated platinum group metal silicone resin catalyst in accordance with claim 1, where the organic solvent solution of the platinum group metal complex is a reaction product of a platinum halide and a vinylsiloxane.

3. A particulated platinum group metal silicone resin catalyst in accordance with claim 2, where the platinum group metal complex is a reaction product of chloroplatinic acid and divinyltetramethyldisiloxane.

4. A method for making a particulated platinum group metal silicone resin catalyst, having from about 0.05% to about 5% by weight of chemically combined platinum group metal, which comprises spray drying at a temperature of about 80° C. to about 300° C., a mixture comprising by weight, (C) 100 parts of an organic solvent solution of an alkenyl substituted organosiloxane resin comprising chemically combined organosiloxy units and $SiO_2$ units, and, (D) 0.1 to 50 parts of an organic solvent solution of a platinum group metal complex.

5. A method in accordance with claim 4, where the platinum group metal complex is a reaction product of chloroplatinic acid and a vinylmethylsiloxane.

6. A method in accordance with claim 4, where the alkenyl substituted organosiloxane resin is a vinylmethylsiloxane resin.

7. A substantially solvent free heat curable organopolysiloxane composition comprising by weight, (E) 100 parts of a vinylsiloxane fluid having a viscosity of about 100 to about 500,000 centipoise at 25° C., (F) 1 to 40 parts of a silicon hydride siloxane, and, (G) an effective amount of a particulated platinum group metal silicone resin catalyst having an indefinite shelf stability at ambient temperatures, comprising, a spray-dried product of (H), an organic solvent solution of an alkenyl substituted organosiloxane resin comprising chemically combined $SiO_2$ units, and organo siloxy units, and an average ratio of about 0.01 to about 2.5 alkenyl radicals per silicon atom, and (I) an organic solvent solution of a platinum group metal complex, which particulated platinum group metal silicone resin catalyst has an average of from about 0.05% to about 5% by weight of chemically combined platinum group metal.

8. A solvent free heat curable organopolysiloxane composition in accordance with claim 7, where the vinylsiloxane fluid is a vinylmethylsiloxane fluid.

* * * * *